United States Patent
Martinez et al.

(10) Patent No.: US 11,837,025 B2
(45) Date of Patent: Dec. 5, 2023

(54) METHOD AND APPARATUS FOR ACTION RECOGNITION

(71) Applicant: SAMSUNG ELECTRONICS CO., LTD., Suwon-si (KR)

(72) Inventors: Brais Martinez, Staines (GB); Tao Xiang, Staines (GB); Victor Augusto Escorcia, Staines (GB); Juan Perez-Rua, Staines (GB); Xiatian Zhu, Staines (GB); Antoine Toisoul, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 185 days.

(21) Appl. No.: 17/421,073

(22) PCT Filed: Feb. 16, 2021

(86) PCT No.: PCT/KR2021/001953
§ 371 (c)(1),
(2) Date: Jul. 7, 2021

(87) PCT Pub. No.: WO2021/177628
PCT Pub. Date: Sep. 10, 2021

(65) Prior Publication Data
US 2023/0145150 A1    May 11, 2023

(30) Foreign Application Priority Data

Mar. 4, 2020    (GB) ..................................... 2003088
Nov. 9, 2020    (EP) ..................................... 20206371

(51) Int. Cl.
*G06V 40/20*    (2022.01)
*G06V 10/764*    (2022.01)
(Continued)

(52) U.S. Cl.
CPC ............ *G06V 40/20* (2022.01); *G06V 10/764* (2022.01); *G06V 10/77* (2022.01); *G06V 10/82* (2022.01); *G06V 20/40* (2022.01)

(58) Field of Classification Search
CPC ........ G06V 40/20; G06V 10/77; G06V 10/82; G06V 20/40
See application file for complete search history.

(56) References Cited

U.S. PATENT DOCUMENTS 11,631,484 B1 *    4/2023    Hanina ..................... G06N 5/04
                                                    706/11
11,632,345 B1 *    4/2023    Taylor ................... H04L 51/216
                                                    455/412.2
(Continued)

FOREIGN PATENT DOCUMENTS

CN           107153812 A       9/2017
KR     10-2019-0103916 A       9/2019
(Continued)

OTHER PUBLICATIONS

Wang, Limin et al., "UntrimmedNets for Weakly Supervised Action Recognition and Detection", IEEE Conference on Computer Vision and Pattern Recognition (CVPR 2017), Jul. 1, 2017, pp. 6402-6411, XP055551831.
(Continued)

*Primary Examiner* — Ming Y Hon
(74) *Attorney, Agent, or Firm* — Sughrue Mion, PLLC

(57) ABSTRACT

Broadly speaking, the present techniques relate to a method and apparatus for performing action recognition, and in particular to a computer-implemented method for performing action recognition on resource-constrained or lightweight devices such as smartphones. The ML model may be adjusted to achieve required accuracy and efficiency levels, while also taking into account the computational capability of the apparatus that is being used to implement the ML (Continued)

model. One way is to adjust the number of channels assigned to the first set of channels, i.e. the full temporal resolution channels. Another way is to adjust the point in the ML model where the temporal pooling layer or layers are applied.

15 Claims, 7 Drawing Sheets

(51) Int. Cl.
    *G06V 10/82*     (2022.01)
    *G06V 20/40*     (2022.01)
    *G06V 10/77*     (2022.01)

(56) References Cited

U.S. PATENT DOCUMENTS

| | | | |
|---|---|---|---|
| 2008/0310734 A1 | 12/2008 | Ahammad et al. | |
| 2017/0206405 A1 | 7/2017 | Molchanov et al. | |
| 2019/0244366 A1* | 8/2019 | Yu | G06N 3/045 |
| 2019/0370667 A1 | 12/2019 | Georgiadis | |
| 2020/0160064 A1* | 5/2020 | Wang | G06F 18/214 |
| 2020/0272823 A1* | 8/2020 | Liu | G06F 18/214 |
| 2021/0027064 A1* | 1/2021 | Osindero | G06N 3/044 |
| 2021/0166009 A1* | 6/2021 | Sun | G06V 40/23 |
| 2021/0390370 A1* | 12/2021 | Fu | G06V 10/82 |
| 2022/0019804 A1* | 1/2022 | Gubbi Lakshminarasimha | G06F 18/241 |
| 2022/0101654 A1* | 3/2022 | Zhang | G06N 3/045 |

FOREIGN PATENT DOCUMENTS

| | | |
|---|---|---|
| KR | 10-2019-0137684 A | 12/2019 |
| WO | 2019/099226 A1 | 5/2019 |
| WO | 2019/112385 A1 | 6/2019 |

OTHER PUBLICATIONS

Communication dated Apr. 20, 2021 by the European Patent Office in European Patent application No. 20206371.5.
Lin et al., "TSM: Temporal Shift Module for Efficient Video Understanding," Cornell University, arXiv:1811.08383v3 [cs.CV], Aug. 22, 2019, Total 14 pages (retrieved on May 15, 2021).
Li et al., "Temporal Bilinear Networks for Video Action Recognition," Cornell University, Xiv:1811.09974v1 [cs.CV], Nov. 25, 2018, Total 9 pages (retrieved on May 15, 2021).
International Search Report and Written Opinion dated Jun. 4, 2021, issued by the International Searching Authority in International Application No. PCT/KR2021/001953 (PCT/ISA/220, 210, 237).
Communication dated Jun. 26, 2023 issued by the European Patent Office in counterpart European Application No. 20206371.5.

* cited by examiner

Figure 5

| Method | Backbone | Frames | FLOPs | Params | Top-1 | Top-5 |
|---|---|---|---|---|---|---|
| SlowFast (Feichtenhofer et al. 2019) | (2+1)D-ResNet-50 | 32×2 | 65G | 34.0M | 47.5 | 76.0 |
| DFB (Martinez et al. 2019) | 3D-ResNet-50 | 64 | – | – | 50.1 | 79.5 |
| S3D-G (Xie et al. 2018) | (2+1)D-Inception | 64 | 66G | 8.77M | 48.2 | 78.7 |
| ECO (Zolfaghari, Singh, and Brox 2018) | BN-Inc+3D-RN18 | 16 | 64G | 47.5M | 41.4 | – |
| GST (Luo and Yuille 2019) | 3D-ResNet-50 | 16 | 59G | 21M | 48.6 | 77.9 |
| ir-CSN (Tran et al. 2019) | dw-3D-ResNet-101 | 32×10 | 74G | – | 48.4 | – |
| TRN (Zhou et al. 2018) | ResNet-50 | 8 | 33G | 31.8M | 38.9 | 68.1 |
| TSM (Lin, Gan, and Han 2019) | ResNet-50 | 8 | 33G | 24.3M | 45.6 | 74.2 |
| TSM (Lin, Gan, and Han 2019) | ResNet-50 | 16 | 65G | 24.3M | 47.2 | 77.1 |
| bLVNet-TAM (Fan et al. 2019) | bLNet | 16×2 | 48G | 25.0M | 48.4 | 78.8 |
| CrossNet$_{0.5;S1, S2}$ | ResNet-50 | 16 | 29G | 20.5M | 50.5 | 79.3 |
| CrossNet$_{0.2;S1, S2}$ | ResNet-50 | 16 | 22G | 22.4M | 49.8 | 78.7 |
| CrossNet$_{0.2;S1, S1}$ | ResNet-50 | 16 | 19G | 22.4M | 49.2 | 78.4 |
| TSM (Lin, Gan, and Han 2019) | ResNet-152 | 16 | 186G | 60M | 50.4 | 79.5 |
| CrossNet$_{0.5;S2, S5}$ | ResNet-152 | 16 | 75G | 47M | 52.5 | 81.4 |
| CrossNet$_{0.2;S1, S2}$ | ResNet-152 | 16 | 51G | 52M | 50.9 | 79.2 |
| TSM (Lin, Gan, and Han 2019) | MobileNetV2 | 16 | 5.1G | 3.5M | 46.8 | 76.1 |
| CrossNet$_{0.5;S2, S5}$ | MobileNetV2 | 16 | 2.5G | 1.7M | 47.2 | 76.8 |

Figure 6

| Method | Backbone | Frames | FLOPs | Params | Top-1 | Top-5 |
|---|---|---|---|---|---|---|
| SlowFast (Feichtenhofer et al. 2019) | ResNet-50 | 64 | 131G | 32M | 60.9 | 87.2 |
| TSN (Wang et al. 2016) | ResNet-50 | 8 | 33G | 24M | 30.0 | 60.5 |
| TRN (Zhou et al. 2018) | BN-Inception | 8 | 16G | 18M | 48.8 | 77.6 |
| TSM (Lin, Gan, and Han 2019) | ResNet-50 | 8 | 33G | 24M | 59.1 | 85.6 |
| TSM (Lin, Gan, and Han 2019) | ResNet-50 | 16 | 66G | 24M | 63.4 | 88.5 |
| bLVNet-TAM (Fan et al. 2019) | bLNet | 16×2 | 48G | 25M | 61.7 | 88.1 |
| CrossNet$_{0.5:S1, S2}$ | ResNet-50 | 16 | 29G | 20.5M | 64.5 | 89.2 |
| CrossNet$_{0.2:S2}$ | ResNet-50 | 16 | 38G | 22.4M | 64.7 | 89.1 |
| CrossNet$_{0.2:S1, S2}$ | ResNet-50 | 16 | 22G | 22.4M | 63.1 | 88.5 |

Figure 7

| Method | Backbone | Init | Frames | FLOPs | Params | Top-1 | Top-5 |
|---|---|---|---|---|---|---|---|
| S3D (Qiu, Yao, and Mei 2017) | Inception | ImageNet | – | 66G | – | 69.4 | 89.1 |
| ECO (Zolfaghari, Singh, and Brox 2018) | BN-Inc+3DRes18 | Kinetics | 16×1 | 64G×1 | – | 69.0 | – |
| R(2+1)D (Tran et al. 2018) | ResNet-34 | Sports-1M | 32×10 | 152G×10 | 64M | 74.3 | 91.4 |
| Non-Local (Wang et al. 2018) | ResNet-50 | ImageNet | 32×10* | 282G×10* | – | 76.5 | 92.6 |
| SlowFast (Feichtenhofer et al. 2019) | ResNet-50 | Scratch | 32×30 | 66G×30 | 32M | 77.0 | 92.6 |
| TSM (Lin, Gan, and Han 2019) | ResNet-50 | ImageNet | 8×10 | 33G×10 | 24M | 72.1 | 90.4 |
| CrossNet$_{0.5:S1, S2}$ | ResNet-50 | ImageNet | 8×10 | 15G×10 | 20.5M | 70.7 | 89.8 |
| TSM (Lin, Gan, and Han 2019) | ResNet-50 | ImageNet | 16×10 | 66G×10 | 24M | 73.8 | 91.4 |
| bLVNet-TAM (Fan et al. 2019) | bLNet | ImageNet | 16×9 | 48G×9 | 25M | 72.0 | 90.6 |
| CrossNet$_{0.5:S1, S2}$ | ResNet-50 | ImageNet | 16×10 | 29G×10 | 20.5M | 73.5 | 91.2 |

Figure 8

| Method | Backbone | Frames | FLOPs | Params | Top-1 | Top-5 |
|---|---|---|---|---|---|---|
| VGG16+LSTM (Graves 2013) | VGG-16 | 16 | — | — | 74.7 | — |
| C3D (Tran et al. 2015) | C3D | 8 | — | — | 81.7 | — |
| C3D (Tran et al. 2015) | C3D | 16 | — | — | 86.4 | — |
| C3D+LSTM+RSTM (Cao et al. 2017) | C3D | 16 | — | — | 89.3 | — |
| I3D (Carreira and Zisserman 2017) | ResNet-50 | 32 | — | — | 90.3 | — |
| TSM (Lin, Gan, and Han 2019) | ResNet-50 | 16 | 66G | 24.0M | 90.4 | 97.1 |
| CrossNet$_{0.2; S1, S2}$ | ResNet-50 | 16 | 22G | 22.4M | 92.3 | 98.0 |

METHOD AND APPARATUS FOR ACTION RECOGNITION

TECHNICAL FIELD

The present application generally relates to a method and apparatus for performing action recognition in videos or video frames, and in particular to a computer-implemented method for performing action recognition on resource-constrained or lightweight devices such as smartphones.

BACKGROUND ART

Image recognition techniques, such as techniques to identify objects or to recognise actions within images, have improved greatly. Attention has now moved to improving image and action recognition within videos, but this remains a difficult problem One of the main reasons why video analysis is more difficult is because videos are multi-frame inputs. In other words, generally speaking if a video comprises 16 frames (i.e. 16 images), analysing the video requires 16 times the resources required to analyse a single frame/image.

Some of the early deep neural network based action recognition models for videos employed 2D convolutional neural networks (CNNs) on static images, and optical flow to endow the model with temporal sensitivity. The efficiency bottleneck is the expensive optical flow computation. Therefore, subsequent research avoided optical flow, and instead modified the neural network architecture by adding a temporally-sensitive module on top of sequences of independently-extracted 2D CNN image features. More recently, the Temporal Shift Module (TSM) proposed instead to add a set of temporal channel shift operations to add temporal sensitivity into the image encoding itself.

3D CNN-based methods have started to dominate recently. 3D CNNs naturally capture temporal information through convolutions with a temporal dimension. However, a direct use of 3D convolutions results in prohibitive computational costs, hindering their practical usage.

Current research on artificial intelligence (AI) based action recognition in videos requires a prohibitively large amount of computation resources when compared to image analysis. The most efficient models currently available have managed to produce state of the art results with computation equivalent to independent 2D forward passes. That is to say, inference for a 16 frame sequence is as expensive as 16 2D forward passes. This is a great improvement over the dominating 3D CNNs-based machinery, yet training a standard single model baseline typically requires at least 4 top-spec GPUs and take several days. However, one of the biggest reasons these models have not been deployed on edge devices is the computational cost after a model has been trained: higher computational cost means more latency, and potentially higher battery consumption. This both prevents practical deployment and bars many researchers from contributing to solving the problem.

The present applicant has recognised the need for an improved AI model for more cost-effective computation for action recognition, which is suitable for implementation on light-weight devices.

DISCLOSURE OF INVENTION

Solution to Problem

The present techniques relate to a method and apparatus for performing action recognition, and in particular to a computer-implemented method for performing action recognition on resource-constrained or lightweight devices such as smartphones. The ML model may be adjusted to achieve required accuracy and efficiency levels, while also taking into account the computational capability of the apparatus that is being used to implement the ML model. One way is to adjust the number of channels assigned to the first set of channels, i.e. the full temporal resolution channels. Another way is to adjust the point in the ML model where the temporal pooling layer or layers are applied.

BRIEF DESCRIPTION OF DRAWINGS

Implementations of the present techniques will now be described, by way of example only, with reference to the accompanying drawings, in which:

FIG. 5 shows a table comparing the performance of the present techniques for performing action recognition to existing techniques, using the "Something-Something v1" video database;

FIG. 6 shows a table comparing the performance of the present techniques for performing action recognition to existing techniques, using the "Something-Something v2" video database;

FIG. 7 shows a table comparing the performance of the present techniques for performing action recognition to existing techniques, using the "Kinetics-400" video database; and FIG. 8 shows a table comparing the performance of the present techniques for performing action recognition to existing techniques, using the "EgoGesture" video database.

BEST MODE FOR CARRYING OUT THE INVENTION

Figure 1A:
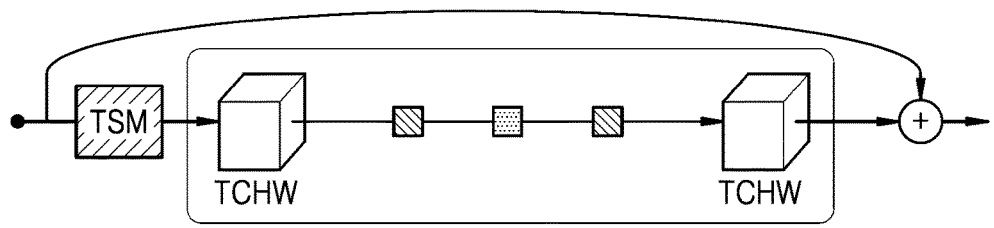
FIG. 1A is a schematic diagram of a bottleneck architecture of a ResNet-based Temporal Shift Module (TSM)

The present techniques generally provide a machine learning, ML, model (or artificial intelligence (AI) algorithm) capable of drastically reducing the GPU memory requirements and the FLOP count when performing action recognition, taking it to sub-independent frame cost by a large margin. The present ML model does not seek to replace a 3D convolution for a more efficient factorisation, but rather to compress an existing network by exploiting the inherent temporal redundancy present in video. This is achieved by developing an ML or neural network building block which can be used to replace building blocks of existing neural network architectures, and by a feature reconstruction loss that reinforces that behaviour through an optimisation objective. The present techniques are built on top of existing 2D ML models (such as Temporal Shift Module (TSM), as TSM is considered one of the most useful techniques for analysing 2D images). This, in turn, offers a much better efficiency-accuracy trade-off compared to 3D CNN-based models.

This is achieved by considering a previously ignored aspect of inference on sequences: the temporal downsampling applied inside the network. The present applicant 1) observes that applying temporal downsampling greatly degrades performance, 2) proposes an architecture that maintains a small amount of the information in full temporal resolution, 3) imposes a loss forcing the proposed network, which includes heavy temporal downsampling, to reconstruct the features of a network without downsampling, and 4) shows that this leads to excellent accuracy-computation trade-offs, greatly surpassing those of the current state of the art.

In a first approach of the present techniques, there is provided a computer-implemented method for video action recognition, comprising: receiving a video comprising a plurality of frames; generating a multi-dimensional feature tensor representing the received video, the tensor comprising a channel dimension having a plurality of channels; and performing action recognition using a machine learning, ML, model comprising a plurality of temporal cross-resolution, TCR, blocks, by: splitting the generated feature tensor in the channel dimension into: a first feature tensor having a first set of channels, and a second feature tensor having a second set of channels; applying at least one temporal pooling layer to the second feature tensor to temporally downsample the second set of channels; processing, in parallel, using each TCR block: the first feature tensor, and the second feature tensor after the second feature tensor has been temporally downsampled; and outputting a prediction of an action within the received video.

In other words, the present techniques provide a dual-pathway neural network as well as a cross-temporal interaction mechanism. This enables fine-grained temporal structure information to be extracted where needed. Any relevant temporal information is funneled through the full temporal resolution branch, while the rest of the information can be encoded at lower temporal resolutions.

The present techniques achieve both efficiency and effectiveness in video action recognition by exploiting temporal redundancy in video through temporal pooling. Furthermore, the present techniques provide a new temporal cross-resolution, TCR, module that is a drop-in replacement of the standard Bottleneck block in existing action recognition networks. The TCR module enables multi-resolution feature learning. Together with feature reconstruction based knowledge distillation, the TCR module compensates for information loss caused by temporal resolution reduction. As explained below with reference to the Figures, experiments show that the present techniques (also referred to herein as the "CrossNet" model) achieves improved performance while using only a fraction of the operations in existing full-resolution ML models.

The TCR module has two tensors as an input (i.e. the first feature tensor and the second feature tensor mentioned above), and outputs two tensors. The two input tensors are one tensor at full temporal resolution, and one tensor with reduced temporal resolution. The TCR module includes interactions between the two input tensors, such that the two input tensors have to be processed in parallel by the TCR module. After the final TCR module of the CrossNet model has been applied, the model may output a single tensor of full temporal resolution.

Thus, the first set of channels may be full temporal resolution channels, and the second set of channels may be low temporal resolution channels.

As explained in more detail below, there are two ways to adjust the ML model to achieve the required accuracy and efficiency levels, while also taking into account the computational capability of the apparatus that is being used to implement the ML model. One way is to adjust the number of channels assigned to the first set of channels, i.e. the full temporal resolution channels. Assigning more channels to the first set of channels may increase accuracy, but may increase the computational cost. Another way is to adjust the point in the ML model where the temporal pooling layer or layers are applied. Increasing the number of temporal pooling layers may reduce computational cost, but may also reduce accuracy.

Splitting the generated feature tensor in the channel dimension may comprise: determining a number of channels of the generated feature tensor; obtaining performance information; and splitting, using a split multiplier $\alpha$, the number of channels into the first set of channels and the second set of channels based on the performance information. The split multiplier $\alpha$ may be selected based on the performance information. The performance information may comprise information on any one or more of the following: inference accuracy, inference speed, video size, video type (e.g. stored/saved or real-time/live-stream), video quality, apparatus/device resources (e.g. memory size, processing power, battery size, etc.).

Applying at least one temporal pooling layer to the second feature tensor may comprise: determining a number of temporal pooling layers and a location of the temporal pooling layers to be applied based on the performance information.

Each TCR block in the machine learning, ML, model, except a final TCR block may: perform two convolution operations on the first and second feature tensors, to maintain a temporal resolution for each set of channels, and perform two cross-resolution convolution operations on the first and second feature tensors.

Performing two cross-resolution convolution operations may comprise: applying a temporal downsampling operation to the first feature tensor; and convolving the temporally downsampled first feature tensor with a 3×3 kernel. After these two operations have been performed, the TCR block may combine the convolved first feature tensor with the second feature tensor using element-wise summation.

Performing two cross-resolution convolution operations may comprise: applying a temporal upsampling operation to the second feature tensor; and convolving the temporally upsampled second feature tensor with a 3×3 kernel. After these two operations have been performed, the TCR block may combine the convolved second feature tensor with the first feature tensor using element-wise summation.

The method may comprise outputting, using the final TCR block in the machine learning, ML, model, a single output tensor of full temporal resolution.

Outputting a prediction of an action within the received video may comprise: determining, using the machine learning, ML, model, an action prediction per frame of the single output tensor; averaging the action prediction over each frame of the single output tensor; and outputting a final action prediction using the averaging.

In a second approach of the present techniques, there is provided an apparatus for video action recognition, the apparatus comprising: a machine learning, ML, model for identifying actions in videos, the machine learning, ML, model comprising a plurality of temporal cross-resolution, TCR, blocks; a gallery application for viewing videos on the apparatus; and at least one processor coupled to memory and arranged to: receive a video comprising a plurality of frames; generate a multi-dimensional feature tensor representing the received video, the tensor comprising a channel dimension having a plurality of channels; and perform action recognition using the machine learning, ML, model by: splitting the generated feature tensor in the channel dimension into a first feature tensor having a first set of channels, and a second feature tensor having a second set of channels; applying at least one temporal pooling layer to the second feature tensor to temporally downsample the second set of channels; processing, in parallel, using each TCR block: the first feature tensor, and the second feature tensor after the second feature tensor has been temporally downsampled; and outputting a prediction of an action within the received video.

The features described above with respect to the first approach apply equally to the second approach.

The apparatus may further comprise at least one image capture device for capturing videos. The at least one processor may perform action recognition on stored or real-time videos captured by the at least one image capture device.

The gallery application comprises a search function for searching for actions within the videos. The at least one processor may be further configured to: receive a search query from the search function of the gallery application; and identify, using the machine learning, ML, model, at least one video in the gallery application that contains an action matching the search query.

The at least one processor may be further configured to: identify, using the machine learning, ML, model, a video snippet showing an action representative of the video, for each video in the gallery; and display the video snippet in the gallery application.

The at least one processor may be further configured to: obtain a video for automatic video editing; identify, using the machine learning, ML, model, a first set of frames in the obtained video which are to be sped-up; identify, using the machine learning, ML, model, a second set of frames in the obtained video which comprise an action and are to be slowed-down; and editing the video to increase a display speed of the first set of frames and decrease a display speed of the second set of frames.

When the received video is a real-time video, the at least one processor may be configured to: identify, using the machine learning, ML, model, an action in the received video; compare the identified action with an expected action to determine whether the identified action matches the expected action; and generate a control signal for outputting an alert to a user of the apparatus on whether the identified action matches the expected action.

In a related approach of the present techniques, there is provided a non-transitory data carrier carrying processor control code to implement the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The method described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

MODE FOR INVENTION

Despite the great progress seen in recent years, video representation learning is still an open problem, and one with a wide range of implications. The use of extremely expensive algorithms, both in terms of computational cost and hardware, is predominant for state of the art methods. A good portion of the methods proposed in recent years rely on 3D convolutions—or some sort of lower cost approximation to them.

Many recent works have focused on improving the computation efficiency of dominant three-dimensional (3D) convolutional neural networks (CNNs).

Human action recognition methods can be divided into graph-based methods, which rely on intermediate inference results such as human pose estimation or object detection, and image-based methods, which directly perform inference from a sequence of RGB images. While the former promise a reduction on data requirements, the latter have consistently provided the state of the art performance on the standard benchmarks. Image-based methods can be further divided into those based on two-dimensional (2D) CNNs and those based on 3D CNNs.

3D CNNs: Spurred by the appearance of large-scale video datasets, 3D CNNs resulted in early success in the field of action recognition. The 3D convolutions can inherently capture temporal information, which seem suited for video analysis in general and action recognition in particular. Furthermore, it has been proposed to combine two networks, one taking high-frequency frame sampling that is processed through a lightweight network, and another that samples less frames but uses a more complex backbone. Instead, other work proposed to apply insights of fine-grained image classification to the action recognition problem by using a second head that would be sensitive to localized spatio-temporal patterns. Finally, other researchers proposed an attention mechanism specific for video understanding by adapting a popular self-attention mechanism of language understanding.

However, 3D CNNs result in extreme computational cost, both in terms of GPU memory usage and computation cost. Thus, there has been a significant body of research proposing efficient alternatives to 3D convolutions that would result in lower computational cost while maintaining the sensitivity to motion. For example, it has been proposed to factorize the 3D convolution into a purely spatial convolution followed by a purely temporal convolution, or to extract features on a frame-level basis using standard 2D convolutions and then use 3D convolutions on top of them to add temporal information, or to develop a novel architecture of independent streams of computation that are mixed together at specific points. While performance has remained high, the alternatives with more feasible computational requirements routinely loose significant accuracy while still resulting in a high cost.

2D CNNs: Unlike 3D CNNs, 2D CNNs do not rely on 3D convolutions, thus being inherently more efficient. Furthermore, they typically take a smaller number of frames. The temporal segment networks (TSN) sampler has been widely adopted as it provides very high performance while using much fewer frames than 3D CNNs. However, since 2D CNNs compute independent forward passes, they lack temporal information. Thus, the two stream approach was proposed, where the standard RGB network is combined with an optical flow network to add temporal sensitivity, and their predictions are combined through late fusion. However, computing flow is expensive—especially the kind that is required to attain high performance. The use of RGB difference instead of Optical Flow was shown to still provide some benefit, while some research used a teacher-student approach so that the RGB stream alone would recover the performance of the two-stream network so that at test time, only the RGB stream is necessary.

Beyond the 2D vs. 3D categorization: Very recently the temporal shift module (TSM) was proposed as a simple yet very effective way to bridge the gap between the two approaches. TSM proceeds with independent 2D forward passes, but at the beginning of each block it shifts some activation channels between temporally adjacent frames. This simple mechanism leads to very competitive results, yet adds no FLOPs with respect to purely 2D approaches. Even more recently, a method has been proposed which allows for further gains by network changing the backbone and using what they coin as the Temporal Aggregation Module (TAM). The TAM can be used as a drop-in replacement of the shift operation, results in a negligible increase of FLOPs and improves performance.

It is however very surprising that an extremely simple mechanism like a shift is enough to inject temporal information into the otherwise independent 2D forward passes. In fact, the TSM can at least match the 3D CNN when using a ResNet-50 backbone, and does so using 4 times fewer input frames. Thus, the accuracy-performance trade-off is overwhelmingly in favour of TSM.

Video Action Classification Background

The input of a video classification model, a sequence composed of n frames $\{X_i\}_{i=1:n}$ of a video sample, is denoted as $X=(X_1, \ldots, X_n)$. To classify a video sample, what a 2D CNN based method does typically consist of two steps: 1) independent forward passes all the frames of a video through a 2D CNN f, 2) and using a temporal fusion function g (typically average) that aggregates the independent per-frame predictions to obtain the video-level prediction as:

$$F(X)=g(f(X_1), \ldots, f(X_n)) \quad (1)$$

While this simple aggregation approach has been shown to be effective for some human action datasets, its inability to capture temporal evolution means that it fails on other datasets where the temporal signal is more important and necessary for action recognition.

Very recently, some methods have attained significant success by augmenting this framework with a very simple operation that shares information between temporally-adjacent frames. This operation is applied at multiple points within the network, endowing the 2D forward passes with much-needed temporal structure modelling ability. This approach is designed to be either operation-free or very cheap so that the overall computation cost is that of the 2D forward passes. That is to say, the computation cost for a sequence of n frames is n times that of a 2D forward pass.

Given an activation $A^l=(A^l_1, \ldots, A^l_n)$ from layer 1, the aforementioned operation is applied prior to the convolutions within a block as follows:

$$A^{l+1}=A^l+F^l(\hat{A}^l)=A^l+f^l(\hat{A}^l_1, \ldots, \hat{A}^l_n) \quad (2)$$

$$\text{where } \hat{A}^l_t = G(A^l_{t-1}, A^l_t, A^l_{t+1}) \quad (3)$$

Concretely, in TSM, G can be an inter-frame channel shift operation, that shifts a fraction (e.g., 1) of channels from the (t−1)-th and (t+1)-th tensors into t-th tensor; while the TAM module uses a depthwise convolution and aggregation prior to the shift operation.

As an analogue of spatial pooling in 2D CNN, temporal pooling is a key strategy for efficiency enhancement in video action recognition, as it reduces the number of frames of a video sample and hence the computational costs of all subsequent operations ever since. Specifically, in video analysis every single frame of a video sample is often represented by a 3D uni-shape feature tensor at an intermediate layer; So a video sample is then expressed as a 4D feature tensor $F \in \mathbb{R}^{C \times T \times H \times W}$, where C, T, H, W denote the channel, time, height and width of the feature map. A temporal pooling operation maps on such a tensor as:

$$F \in \mathbb{R}^{C \times T \times H \times W} \to F' \in \mathbb{R}^{C \times T/r \times H \times W} \quad (4)$$

where the temporal stride r controls the temporal sparsity of the pooling, and a typical setting is r=2. Thus, subsequent computations are performed on the feature tensor F'. This has two main benefits: it cuts both the computational complexity and the GPU memory requirements by half, with the latter being of particular importance for video analysis.

The design of 3D CNNs relies on temporal pooling to reduce the already prohibitive computational cost. For example, some techniques use a CNN with 4 temporal pooling points, while 2 pooling points are used in other occasions. However, the use of temporal pooling also results in significant degradation of the model accuracy.

Furthermore, surprisingly, 3D CNNs do require 64 frames input to achieve similar performance to a 16-frame TSM model, resulting in a massive disparity of computational and memory costs. Even worse, a shift operation can be represented as a 3D convolution, and the modelling capacity of a 3D convolution is much higher than that of a shift operation. 3D CNNs may struggle to match the performance of a TSM because 3D CNNs are hindered by the temporal pooling mechanism, which effectively destroys the temporal signal. Hence, a 64 frame input and a network with 2 temporal pooling layers should perform in the range to a network with 16 frames and no temporal pooling.

The present techniques enjoy the computational and memory efficiency of temporal pooling mechanisms, and at the same time maintain as much performance as possible with respect to a model without temporal pooling.

The present techniques improve the cost-effectiveness of temporal pooling using a basic Temporal Cross-Resolution, TCR, module. The TCR modules may be integrated into a baseline model to provide a CrossNet neural network. The key idea behind the TCR module (and CrossNet) is to dedicate a small fraction of feature channels to preserve the fine-grained temporal information by avoiding any temporal pooling operations, whilst the remaining channels are temporally downsampled as per the model design. The present techniques further impose that the resulting network is able to reconstruct the features of a network without temporal downsampling—i.e., the network is forced to funnel any relevant temporal information through the full temporal resolution branch, leaving the rest of the information to be encoded at lower temporal resolutions.

With such a video representation learning design, CrossNet minimises the performance drop from temporal pooling as typically experienced. CrossNet can be used as a drop-in replacement to the building blocks of a network (e.g., a Bottleneck block of a ResNet). CrossNet is end-to-end trainable, allowing the network to discover such channel split without a need for any prior knowledge or ad hoc network designs.

Temporal Cross-Resolution Module.

FIG. 1A is a schematic diagram of a bottleneck block of a ResNet-based Temporal Shift Module (TSM). It takes as input a 4D video feature tensor TCHW, and outputs another same-shape tensor. This network has a single-pathway design. The bottleneck block may perform a sequence of convolution operations on the 4D feature tensor with the kernel size at 1×1, 3×3 and 1×1, in that order. The bottleneck block also includes a shortcut connection between the two ends to realise residual feature learning. The main idea of TSM is to endow the otherwise independent 2D forward passes with temporal context through a temporal shift operation. The temporal shift operation is typically placed prior to the convolutions of a bottleneck block but after the skip connection.

Functionally, CrossNet serves as an alternative of the standard bottleneck that specially enables a video model to achieve cost-effective temporal pooling. A key element of CrossNet is a new Temporal Cross-Resolution (TCR) block for reducing computational cost by exploiting the temporal redundancy in video. Functionally, the TCR block serves as a drop-in replacement of the conventional bottleneck block (such as that shown in Figure TA). A TCR block dedicates only a fraction of the feature channels to maintain the representation with full temporal resolution, while the rest of the channels can undergo temporal downsampling to reduce the computational complexity. This design provide an underlying structure for minimising temporal redundancy in videos while preserving the fine temporal information. Intermediate activations, both input and output, are represented as a pair of spatial-temporal tensors. The two streams interact with each other through cross-resolution convolutions, effectively transferring information between the lower temporal resolution representation and the full temporal resolution representation. This enables effective learning of multi-temporal-resolution feature representations in each stream.

To place TCR in video model context, the TSM is taken as the baseline video model as the main instantiation, though other existing video models can be similarly integrated with TCR. TSM is selected because it represents the current best trade-off between efficiency and accuracy among all existing video models. It is thus ideal for verifying the efficacy of TCR, and further improve the trade-off.

Figure 1B:
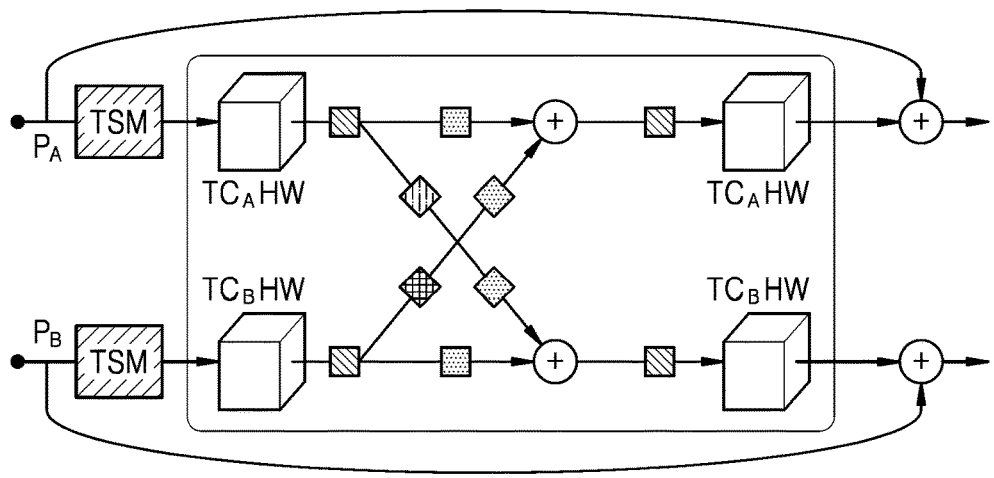
FIG. 1B is a schematic diagram of a Temporal Cross-Resolution (TCR) block.

FIG. 1B is a schematic diagram of a Temporal Cross-Resolution (TCR) block. To overcome the aforementioned limitation, the present techniques improve the standard bottleneck by introducing a dual-pathway design along with a cross-temporal-resolution interaction mechanism, as shown in FIG. 1B. Generally speaking, the feature channels of a multi-dimensional feature tensor representing an input video are split into two streams with bi-directional cross-stream interactions. Two pathways $P_A$ and $P_B$ split the input feature tensor TCHW in the channel dimension to obtain their input $TC_AHW$ and $TC_BHW$ (such that $C_A+C_B=C$). Both pathways in isolation are composited in a similar manner as a bottleneck in terms of convolution operation, and are equipped with bidirectional interaction. $P_B$ applies temporal pooling with stride r.

Each interaction takes place on the 3×3 convolution of a bottleneck-like architecture. More specifically, each tensor after the split first undergoes a shift operation and independent 1×1 convolutions. This is followed by the cross-resolution convolutions and independent 1×1 convolutions. The TCR block is completed by a pair of batch normalisation and a pair of ReLU layers applied independently to each stream. These operations do not mix channels. A set of four convolution operations are involved in specific TCR instantiation shown in FIG. 1B. Among them, two standard convolutions maintain the temporal resolution for each stream, and the other two convolutions are cross-resolution ones. The high-resolution stream (i.e. the first feature tensor comprising a first set of channels, $P_A$) is temporally downsampled, convolved with a 3×3 kernel, and fused with the lower resolution stream by element-wise summation. Similarly, the lower-resolution stream (i.e. the second feature tensor comprising a second set of channels, $P_B$) is upsampled, convolved and element-wise added to the higher resolution one. In this way, multi-temporal-resolution features can be learned in both streams.

In other words, to preserve the original temporal information, the present techniques keep the original temporal resolution in one pathway (the first set of channels, denoted as $P_A$), and only let the other pathway (the second set of channels, denoted as $P_B$) do temporal pooling for computational efficiency. In doing so, the model is provided an opportunity allowing to extract fine-grained temporal structure information, as it is originally absent. Exploiting the over-parameterising nature of CNN models, the two pathways are built by splitting the channels into two sets. This brings a desired flexibility of easily controlling the trade-off between accuracy and efficiency, i.e., assigning more channels to the pathway $P_B$ with temporal pooling leads to higher efficiency and lower accuracy (at the cost of higher computation), and vice versa. To quantify the channel split, a split multiplier $\alpha \in (0, 1)$ is introduced as:

$$\alpha C \text{ channels} \xrightarrow{\text{assigned to}} \text{pathway } P_A \text{ (w/o temporal pooling)}, \tag{5}$$

$$(1-\alpha)C \text{ channels} \xrightarrow{\text{assigned to}} \text{pathway } P_B \text{ (w/ temporal pooling)} \tag{6}$$

Clearly, higher α values correspond to lower efficiency and higher accuracy.

Assigning more channels to the full-resolution stream ($P_A$) is one way to control or adjust the trade-off between accuracy and efficiency. Modifying the point (stage) of the network where the temporal pooling layers are applied also reduces computations. Adding more pooling layers saves computation cost, but may reduce accuracy.

Cross-temporal resolution interaction. Importantly, the present techniques further develop a cross-temporal resolution interaction mechanism for information exchange across different temporal resolutions within each TCR block. It is realised by a bi-directional feature fusion scheme: $P_A \rightarrow P_B$ and $P_B \rightarrow P_A$ (FIG. 1B). This not only preserves the temporal resolution, but also achieves interactive feature learning across temporal resolutions.

As noted above, specifically, for the direction $P_A \rightarrow P_B$, averaging based temporal downsampling is performed to align the original temporal resolution, apply 3×3 convolutions to align the channel size, and use element-wise summation to fuse the feature tensors from the two pathways. A similar process is designed for $P_B \rightarrow P_A$ with the only difference of using nearest neighbour duplication based temporal upsampling instead for temporal resolution alignment.

Figure 2:
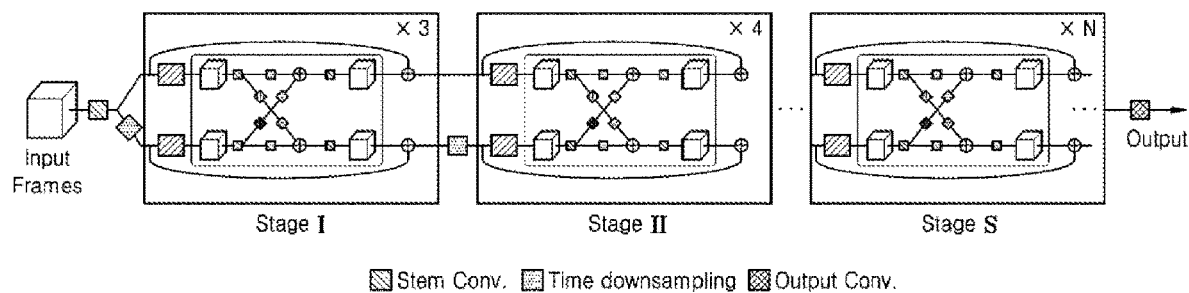
FIG. 2 is a schematic diagram of a neural network comprising TCR blocks of the type shown in FIG. 1B.

CrossNet Architecture. A CrossNet is composed by sequentially stacking multiple TCR blocks as a drop-in replacement of the bottleneck block in an existing action recognition network (e.g. TSM with a ResNet backbone). FIG. 2 is a schematic diagram of a neural network comprising TCR blocks of the type shown in FIG. 1B. The stem layers are the same as for the standard ResNet architecture. As shown in FIG. 2, channels are split at the first temporal downsampling, and if there are any blocks prior to that point, the standard bottleneck design is used. When temporal downsampling is applied, the lower-resolution tensor is transformed prior to the skip connection.

The key difference is that within a CrossNet, two pathways are introduced since the first time of using temporal pooling, running until prior to the final feature layer where $P_B$ is merged into $P_A$ as above. Therefore, the final TCR block in CrossNet returns a single tensor of full temporal resolution, same as the input sequence. This is achieved by simply removing the 3×3 and last 1×1 convolutions of the lower-resolution stream, and adjusting the output channels of the higher-resolution stream accordingly. From that point on, the action recognition processing follows the standard design of 2D-based architecture. Spatial pooling gives a per-frame feature vector, a dense layer yields per-frame predictions, and a final prediction is obtained by averaging the individual ones. It will be understood that other action models (such as I3D) and/or other backbones (such as MobileNet) may be readily integrated with the TCR blocks.

The proposed method consists of a novel architecture and an optimization that combines standard accuracy loss with a feature reconstruction loss. The former allows the network to temporally squeeze part of the activations, and the loss forces the features to have minimal information loss. Introducing temporal pooling in the lower-resolution stream is expected to lead to information loss. The cross-stream interaction design in TCR can alleviate the loss, but not eliminate it completely. Therefore another mechanism is introduced in model optimisation: feature reconstruction based knowledge distillation.

A two-stage training process is introduced for the objective of fully capturing multi-resolution temporal information even with temporal pooling. First, the baseline video model is trained (e.g. TSM) at full temporal resolution. This serves as a teacher model T. Secondly, the proposed CrossNet obtained by integrating TCR with the baseline model is trained as a student network S. To train S, a feature reconstruction loss with respect to the teacher model T is employed, in addition to the standard classification loss.

Figure 3:
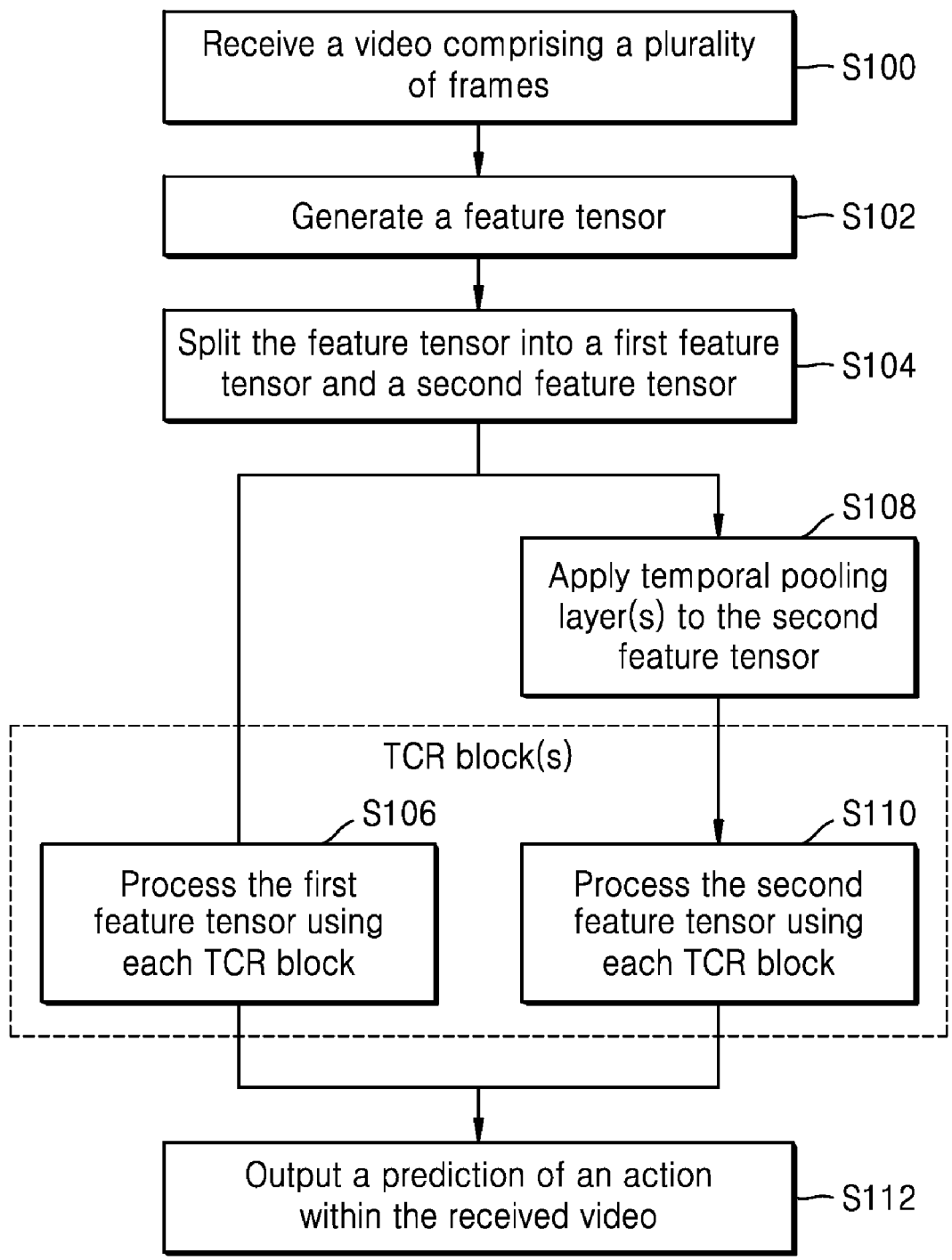
FIG. 3 is a flowchart of example steps to perform action recognition in videos using the neural network of FIG. 2.

FIG. 3 is a flowchart of example steps to perform action recognition in videos using the neural network of FIG. 2. The computer-implemented method for video action recognition begins by receiving a video comprising a plurality of frames (step S100). At step S102, the method comprises generating a multi-dimensional feature tensor representing the received video, the tensor comprising a channel dimension having a plurality of channels. The method then comprises performing action recognition using a machine learning, ML, model comprising a plurality of temporal cross-resolution, TCR, blocks. To do so, the generated feature tensor is split/divided in the channel dimension into: a first feature tensor having a first set of channels, and a second feature tensor having a second set of channels (step S104).

The step S104 of splitting the feature tensor in the channel dimension may comprise determining a number of channels of the generated feature tensor; obtaining performance information; and splitting, using a split multiplier $\alpha$, the number of channels into the first set of channels and the second set of channels based on the performance information. The split multiplier $\alpha$ may be selected based on the performance information. The performance information may comprise information on any one or more of the following: inference accuracy, inference speed, video size, video type (e.g. stored/saved or real-time/live-stream), video quality, apparatus/device resources (e.g. memory size, processing power, battery size, etc.). A user may specify the inference accuracy and/or inference speed themselves. For example, a user may be able to adjust the inference accuracy and/or speed from a default value or setting.

As explained herein, the CrossNet machine learning model is designed to perform video action recognition on-device, where the device may be a light-weight or resource-constrained device such as a smartphone. Many video action recognition networks are optimised to run on computers or servers having essentially unlimited resources. In contrast, the performance information may include information on the resources of the apparatus on which CrossNet is to run, so that the split multiplier can take the resources into account when splitting the channels of the generated feature tensor. For example, if the apparatus is a high-end or premium tier smartphone, the split multiplier may assign more channels to the full-resolution stream (i.e. the first set of channels), while if the apparatus is a mid-range smartphone, the split multiplier may assign fewer channels to the full-resolution stream, thereby taking into account the processing power, battery life, etc. of each type of smartphone. This advantageously enables CrossNet to be adapted to suit the apparatus on which it runs.

As explained above with respect to FIGS. 1B and 2, the first set of channels may be full temporal resolution channels, and the second set of channels may be low temporal resolution channels.

The method comprises applying at least one temporal pooling layer to the second feature tensor (step S108), prior to the second feature tensor being processed by the TCR blocks. The temporal pooling layers are as described above with respect to FIGS. 1B and 2. Applying at least one temporal pooling layer to the second feature tensor may comprise: determining a number of temporal pooling layers and a location in the ML model of the temporal pooling layers to be applied based on the performance information (i.e. the performance information used at step S104). That is, the ML model may temporally downsample (using the temporal pooling layer(s)) the second feature tensor once before being processed by the TCR blocks, or may temporally downsample the second feature tensor at more than one point or stage within the ML model. FIG. 2 for example shows how the second feature tensor may be temporally downsampled once before the first TCR block (Stage 1) and again before the second TCR block (Stage 2). It will be understood that at least one temporal pooling layer is required, such that that the first TCR block in the ML model processes one full resolution tensor and one temporally downsampled tensor. Further temporal pooling layers may be provided in the ML model before other TCR blocks depending on the performance information.

Each TCR block of the ML model then receives the first feature tensor and the second feature tensor (which has been temporally downsampled) as inputs, and processes both the first and second feature tensors in parallel. As noted above, each TCR block includes interactions between the two input tensors, such that the two input tensors have to be processed in parallel by the TCR module. More specifically, each TCR block, except a final TCR block, may perform four convolution operations. For example, the TCR blocks (except the final TCR block) may: perform two convolution operations on the first and second feature tensors, to maintain a temporal resolution for each set of channels, and perform two cross-resolution convolution operations on the first and second feature tensors.

Thus, the method comprises processing the first feature tensor using each TCR block while preserving temporal information in the first feature tensor (step S106). In this case, performing two cross-resolution convolution operations may comprise: applying a temporal downsampling operation to the first feature tensor; and convolving the temporally downsampled first feature tensor with a 3×3 kernel. After these two operations have been performed, the TCR block may combine the convolved first feature tensor with the second feature tensor using element-wise summation.

The method comprises processing the second feature tensor (which has already been temporally downsampled) using each TCR block (step S110). In this case, performing two cross-resolution convolution operations may comprise: applying a temporal upsampling operation to the second feature tensor; and convolving the temporally upsampled second feature tensor with a 3×3 kernel. After these two operations have been performed, the TCR block may combine the convolved second feature tensor with the first feature tensor using element-wise summation. As shown in FIG. 3, step S106 is performed at the same time as (i.e. in parallel with) performing step S110.

The method may comprise outputting, using the final TCR block in the machine learning, ML, model, a single output tensor of full temporal resolution (not shown).

The method may comprise outputting a prediction of an action within the received video (step S112). Outputting a prediction of an action within the received video may comprise: determining, using the machine learning, ML, model, an action prediction per frame of the single output tensor; averaging the action prediction over each frame of the single output tensor; and outputting a final action prediction using the averaging.

Figure 4:
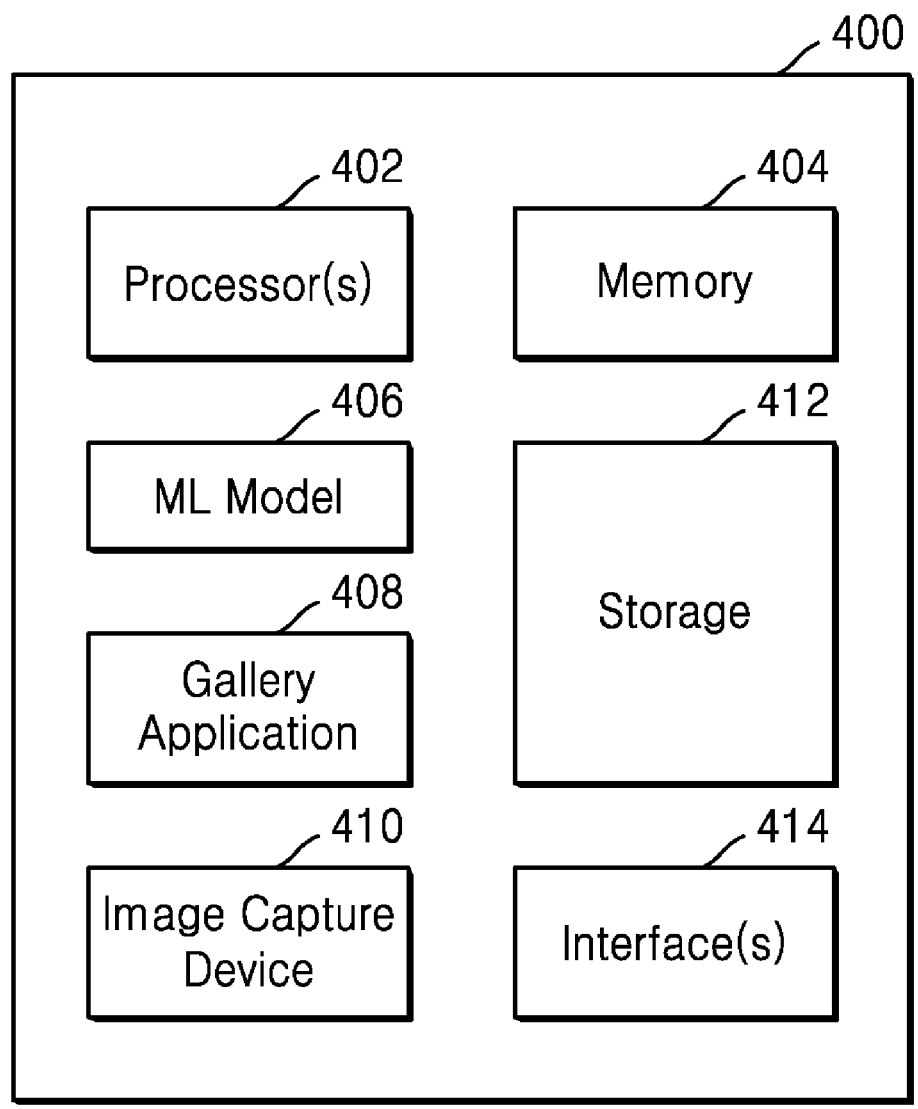
FIG. 4 is a block diagram of an apparatus for performing action recognition using the neural network of FIG. 2.

FIG. 4 is a block diagram of an apparatus 400 for performing video action recognition using the neural network of FIG. 2. The apparatus 400 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example devices.

The apparatus 400 comprises a machine learning, ML, model 406 for identifying actions in videos, the machine learning, ML, model comprising a plurality of temporal cross-resolution, TCR, blocks. The apparatus 400 comprises a gallery application 408 for viewing videos on the apparatus 400.

The apparatus 400 comprises at least one processor 402 coupled to memory 404. At least one processor 402 may comprise one or more of: a microprocessor, a microcontroller, and an integrated circuit. The memory 404 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The at least one processor 402 may be arranged to: receive a video comprising a plurality of frames; generate a multi-dimensional feature tensor representing the received video, the tensor comprising a channel dimension having a plurality of channels; and perform action recognition using the machine learning, ML, model 406 by: splitting the generated feature tensor in the channel dimension into a first feature tensor having a first set of channels, and a second feature tensor having a second set of channels; applying at least one temporal pooling layer to the second feature tensor to temporally downsample the second set of channels; processing, in parallel, using each TCR block: the first feature tensor, and the second feature tensor after the second feature tensor has been temporally downsampled; and outputting a prediction of an action within the received video.

The apparatus 400 may further comprise at least one image capture device 410 for capturing videos. The at least one processor 402 may perform action recognition on stored videos (i.e. previously recorded videos) or real-time/live-stream videos captured by the at least one image capture device 410.

The apparatus 400 may comprise storage 412 for storing, among other things, previously recorded videos captured by the image capture device 410.

The apparatus 400 may comprise one or more interfaces 414 that enable the apparatus 400 to receive inputs and/or provide outputs. For example, the apparatus 400 may comprise a display screen to receive user inputs (e.g. a user search query for a particular action in a video), and to display the results of implementing the ML model 406 (e.g. the results of the user search query).

The gallery application 408 may comprise a search function for searching for actions within the videos. The at least one processor 402 may be further configured to: receive a search query from the search function of the gallery application; and identify, using the ML model 406, at least one video in the gallery application 408 that contains an action matching the search query. For example, the user's search query may be for "playing guitar", indicating they are seeking videos, or sections of videos, which show or contain someone playing a guitar. The ML model 406 may be used to analyse the videos in the gallery application to identify actions within the videos, and then determine if any of the identified actions match the user's search query. The processor 402 may output any videos that match the search query. In some cases, some or all of the videos in the gallery application may have already been processed by the ML model 406, and any identified actions within the videos may have been appended as labels to the videos. In this case, the labels of any previously processed videos may be used to identify any videos matching the search query.

The at least one processor 402 may be further configured to: identify, using the ML model 406, a video snippet showing an action representative of the video, for each video in the gallery; and display the video snippet in the gallery application. In this case, the ML model 406 may be used to identify a representative frame or set of frames of the video, which depict an action that best represents the video as a whole. The representative frame(s) may be provided a snippet or short video that allows a user to quickly determine what the full video relates to. In other words, the representative frame(s) may be a highlight image or short highlight video, which is based on the longer video in the gallery.

The at least one processor 402 may be further configured to: obtain a video for automatic video editing; identify, using the ML model 406, a first set of frames in the obtained video which are to be sped-up; identify, using the ML model 406, a second set of frames in the obtained video which comprise an action and are to be slowed-down; and editing the video to increase a display speed of the first set of frames and decrease a display speed of the second set of frames. Thus, the ML model 406 may be used to automatically edit videos so that interesting frames (i.e. frames which depict actions that best represent the video as a whole) are slowed-down while frames which are not interesting or do not contain any actions are sped-up in the edited video. This allows users to focus on and enjoy the more interesting frames of a video, while skipping the less interesting frames. Similarly, the ML model 406 may be used to perform digital zooming, i.e. automatic video zooming based on the actions identified within the video. This may enable an edited video to be generated in which interesting actions are zoomed-in on, to help highlight the interesting actions in the video.

When the received video is a real-time video, the at least one processor 402 may be configured to: identify, using the ML model 406, an action in the received video; compare the identified action with an expected action to determine whether the identified action matches the expected action; and generate a control signal for outputting an alert to a user of the apparatus on whether the identified action matches the expected action. For example, the apparatus 400 may be a smartphone or robot assistant device which can view (if granted any required permissions) a user's actions while they are performing a task, such as while they are following an online exercise class or while they are following a food recipe. The image capture device(s) 410 of the apparatus 400 may capture a live-stream of the user's actions and may be able to determine if the user is correctly performing some actions of the task by comparing it with expected actions. For example, if the user is required to hold a particular yoga pose in their online exercise class, the live-stream may be analysed to determine if the user's yoga pose matches the expected pose (which may be that shown in the online class by the class instructor/yoga teacher). Similarly, if the user is required to finely dice onions for a recipe, the live-stream may be analysed to determine if the user has correctly diced the onions (where the expected action may be depicted in a video showing the recipe, or may be obtained from elsewhere). If the user's action matches the expected action, the apparatus 400 may output a positive message to the user such as "well done!" in the form of a text alert/pop-up, or aural message, or similar. Additionally or alternatively, if the user's action does not match the expected action (e.g. their yoga pose is incorrect, or if they have sliced onions instead of dicing the onions), the apparatus 400 may output a message to the user such as "error" or "this doesn't match the instructions", to prompt the user to correct their actions. In other words, the present techniques may provide an "AI fitness instructor" tool, which automatically checks the user's yoga or exercise pose, checks what pose the user is supposed to be doing, and generates instructions for the user so that the user can correct their exercise pose to what they should be doing.

It will be understood that these are just some examples of how the ML model of the present techniques could be used to recognise actions within stored and live-stream videos. In each case, it is the TCR module/block of the ML model which enables the ML model to be implemented on resource-constrained devices such as smartphones and consumer electronic devices.

The CrossNet network of the present techniques was evaluated on four popular large-scale video action recognition datasets:

Something-Something V1 (SSV1), a dataset with 108,499 videos including 174 fine-grained action classes involving human-object interactions in diverse background scenes;

Something-Something V2 (SSV2), a new iteration of SSV1 containing 220,847 videos with higher resolution and reduced annotation noise;

Kinetics400 (K400), a large-scale dataset with 400 classes and about 300,000 typically lasting 10 seconds, where the sequences are trimmed from YouTube videos; and EgoGesture, the largest hand gesture dataset currently available, including 21,161 trimmed videos from 83 classes captured by a head-mounted camera in a first-person view.

FIG. 5 shows a table comparing the performance of the present techniques for performing action recognition to existing techniques, using the "Something-Something v1" video database. Entries in bold indicate the best performance within a category. The top section of the table shows 3D convolution based methods, the second section shows 2D convolution based methods, while the bottom two sections show CrossNet obtained by TSM+TCR in different configurations and backbones. CrossNet$_{0.5;S1;S2}$ indicates a channel split ratio of α=0.5, and 2 temporal pooling layers applied before stages S1 and S2. It can be seen that, using the most popular ResNet-50 as backbone, the CrossNet variants achieved the highest accuracy while being significantly more computationally-efficient. CrossNet offers great flexibility in controlling the trade-off between accuracy and efficiency by simply adjusting the number of channels assigned to the low-resolution stream (i.e. changing the value of the split multiplier α), and where and how many temporal pooling layers are inserted. CrossNet can work with any network backbone. With the lightweight and mobile device friendly MobileNetV2 backbone, TSM brings the computational cost down to 5.1 GFLOPs. However, CrossNet can still further yield a 50% FLOP reduction without any drop in performance, achieving 47.2% top-1 accuracy with only 2.5 GFLOPs. This makes CrossNet particularly suitable for implementation on constrained-resource devices, such as smartphones and consumer electronic devices.

FIG. 6 shows a table comparing the performance of the present techniques for performing action recognition to existing techniques, using the "Something-Something v2" video database. Here, the upper section shows 3D-based methods, the middle section shows 2D-based methods, and the bottom section shows CrossNet. Three different types of CrossNet were evaluated: one where the channel split multiplier α=0.5, and the temporal pooling was applied before stages S1 and S2; one where the channel split multiplier α=0.2, and the temporal pooling was applied before stage S2; and one where the channel split multiplier α=0.2, and the temporal pooling was applied before stages S1 and S2. The results are similar to those shown in FIG. 5. Specifically, CrossNet improves the accuracy results over its TSM baseline with a fraction of the computational cost.

FIG. 7 shows a table comparing the performance of the present techniques for performing action recognition to existing techniques, using the "Kinetics-400" video database. Kinetics-400 has been widely used for benchmarking action recognition models. Here FLOPs are per crop, and the number of crops is indicated by the multiplicative factor. The * is used to mean that spatial fully convolutional mode was used during evaluation instead of different spatial crops (and thus, the number of FLOPs change depending on the video aspect ratio). When compared on the same computational budget (e.g. CrossNet 16-frame setting compared to the TSM 8-frame setting), the CrossNet method achieves a 1.4% top-1 improvement.

FIG. 8 shows a table comparing the performance of the present techniques for performing action recognition to existing techniques, using the "EgoGesture" video database. Methods which use depth images were excluded during training. It can be seen from the table that CrossNet consistently outperforms all the competitors when integrated with TSM.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:
1. A method of performing video action recognition, the method comprising:
receiving a video comprising a plurality of frames;
generating a multi-dimensional feature tensor representing the received video, the multi-dimensional feature tensor having a plurality of channels; and performing action recognition using a machine learning (ML) model comprising a plurality of temporal cross-resolution (TCR) blocks, by:
splitting the multi-dimensional feature tensor into:
a first feature tensor having a first set of channels, and
a second feature tensor having a second set of channels;
applying at least one temporal pooling layer to the second feature tensor to temporally downsample the second feature tensor;
processing, in parallel, using each TCR block among the plurality of TCR blocks:
the first feature tensor, and
the temporally downsampled second feature tensor; and
outputting a prediction of an action within the received video.

2. The method of claim 1, wherein the splitting of the multi-dimensional feature tensor comprises:
determining a number of the plurality of channels of the multi-dimensional feature tensor;
obtaining performance information; and
splitting, using a split multiplier, the plurality of channels into the first set of channels and the second set of channels based on the performance information.

3. The method of claim 2, wherein the applying of the at least one temporal pooling layer to the second feature tensor comprises:
determining a number of temporal pooling layers and a location in the ML model of the temporal pooling layers to be applied based on the performance information.

4. The method of claim 1, wherein the each TCR block among the plurality of TCR blocks, except a final TCR block:
performs two convolution operations on the first and second feature tensors, to maintain a temporal resolution for each set of channels, and
performs two cross-resolution convolution operations on the first and second feature tensors.

5. The method of claim 4, wherein the performing of the two cross-resolution convolution operations comprises:
applying a temporal downsampling operation to the first feature tensor; and
convolving the temporally downsampled first feature tensor with a 3×3 kernel, and
wherein the each TCR block combines the convolved first feature tensor with the second feature tensor using element-wise summation.

6. The method of claim 4, wherein the performing of the two cross-resolution convolution operations comprises:
applying a temporal upsampling operation to the second feature tensor; and
convolving the temporally upsampled second feature tensor with a 3×3 kernel, and
wherein the each TCR block combines the convolved second feature tensor with the first feature tensor using element-wise summation.

7. The method of claim 4, further comprising:
outputting, using the final TCR block in the ML model, a single output tensor of full temporal resolution.

8. The method of claim 7, wherein the outputting of the prediction of the action within the received video comprises:
determining, using the ML model, an action prediction over each frame of the single output tensor;
averaging the action prediction over the each frame of the single output tensor; and
outputting a final action prediction using the averaging.

9. A non-transitory machine-readable medium containing instructions that when executed cause at least one processor of an apparatus to perform operations corresponding to the method of claim 1.

10. An apparatus for performing video action recognition, the apparatus comprising:
a machine learning (ML) model for identifying actions in videos, the ML model comprising a plurality of temporal cross-resolution (TCR) blocks;
a gallery application for viewing the videos on the apparatus; and
at least one processor coupled to memory and configured to:
receive a video comprising a plurality of frames;
generate a multi-dimensional feature tensor representing the received video, the multi-dimensional feature tensor having a plurality of channels; and
perform action recognition using the ML model by:
splitting the multi-dimensional feature tensor into a first feature tensor having a first set of channels, and a second feature tensor having a second set of channels;
applying at least one temporal pooling layer to the second feature tensor to temporally downsample the second feature tensor;
processing, in parallel, using each TCR block among the plurality of TCR blocks:
the first feature tensor, and
the temporally downsampled second feature tensor; and
outputting a prediction of a first action within the received video.

11. The apparatus of claim 10, further comprising at least one image capture device for capturing the videos, wherein the at least one processor is further configured to perform action recognition on stored or real-time videos captured by the at least one image capture device.

12. The apparatus of claim 10, wherein the gallery application comprises a search function for searching for actions within the videos, and
wherein the at least one processor is further configured to:
receive a search query from the search function of the gallery application; and
identify, using the ML model, at least one video in the gallery application that contains a second action matching the search query.

13. The apparatus of claim 10, wherein the at least one processor is further configured to:
identify, using the ML model, a video snippet showing a second action representative of the received video; and
display the video snippet in the gallery application.

14. The apparatus of claim 10, wherein the at least one processor is further configured to:
identify, using the ML model, a first set of frames in the received video which are to be sped-up;
identify, using the ML model, a second set of frames in the received video which comprise a second action and are to be slowed-down; and
editing the received video to increase a display speed of the first set of frames and decrease a display speed of the second set of frames.

15. The apparatus of claim 10, wherein, when the received video is a real-time video, the at least one processor is configured to:

identify, using the ML model, a second action in the received video;
compare the second action with an expected action to determine whether the second action matches the expected action; and
generate a control signal for outputting an alert to a user of the apparatus on whether the second action matches the expected action.

\* \* \* \* \*